(12) United States Patent
Hozumi et al.

(10) Patent No.: US 8,857,324 B2
(45) Date of Patent: Oct. 14, 2014

(54) STEAM OVEN FOR AIRCRAFT

(75) Inventors: Hiroyuki Hozumi, Tokyo (JP); Hiroyuki Hoshino, Tokyo (JP); Mineo Mizukami, Tokyo (JP)

(73) Assignee: Jamco Corporation, Tokyo (JP)

( * ) Notice: Subject to any disclaimer, the term of this patent is extended or adjusted under 35 U.S.C. 154(b) by 245 days.

(21) Appl. No.: 13/218,022

(22) Filed: Aug. 25, 2011

(65) Prior Publication Data

US 2012/0160111 A1 Jun. 28, 2012

(30) Foreign Application Priority Data

Dec. 24, 2010 (JP) .................................. 2010-286963

(51) Int. Cl.
*A23B 4/03* (2006.01)
*F24C 15/32* (2006.01)
*B64D 11/04* (2006.01)

(52) U.S. Cl.
CPC .............. *F24C 15/327* (2013.01); *B64D 11/04* (2013.01)
USPC .......................................................... 99/474

(58) Field of Classification Search
USPC ........................ 99/474; 219/401; 137/624.141
See application file for complete search history.

(56) References Cited

U.S. PATENT DOCUMENTS

| 2,140,701 | A | * | 12/1938 | Jennings | 237/9 R |
| 5,086,806 | A | * | 2/1992 | Engler et al. | 137/486 |
| 5,209,941 | A | * | 5/1993 | Wuest | 426/510 |
| 5,368,008 | A | * | 11/1994 | Oslin | 126/20.2 |
| 6,914,219 | B2 | * | 7/2005 | Kuhne | 219/400 |
| 7,204,270 | B2 | * | 4/2007 | Hendrix | 137/624.12 |
| 2008/0008807 | A1 | * | 1/2008 | Frock et al. | 426/520 |
| 2010/0224616 | A1 | * | 9/2010 | Yasuhara | 219/401 |

FOREIGN PATENT DOCUMENTS

| JP | 05-170288 A | 7/1993 |
| JP | 11-173658 A | 7/1999 |
| JP | 2002-201680 A | 7/2002 |
| JP | 2006-069457 A | 3/2006 |
| JP | 2010-210118 A | 9/2010 |

* cited by examiner

*Primary Examiner* — Dana Ross
*Assistant Examiner* — Renee L Miller
(74) *Attorney, Agent, or Firm* — Westerman, Hattori, Daniels & Adrian, LLP

(57) ABSTRACT

Water leakage of a steam oven provided on an aircraft for heating ingredients is to be prevented.
Two solenoid valves 6 and 7 are inserted in series in a water supply circuit of a steam oven. A power switch 12 supplies a 15 V direct current to the solenoid valves 6 and 7. A controller 1 transmits a command to driving circuits 4 and 5 of the solenoid valves according to a signal of a temperature sensor 10 in the oven. An output of a clock generator 14 is counted by a frequency counter and a time in which the valves are opened is counted. When count of a valve opening time becomes longer than a predetermined value, the power switch 12 of the solenoid valves is disconnected to prevent water leakage.

2 Claims, 5 Drawing Sheets

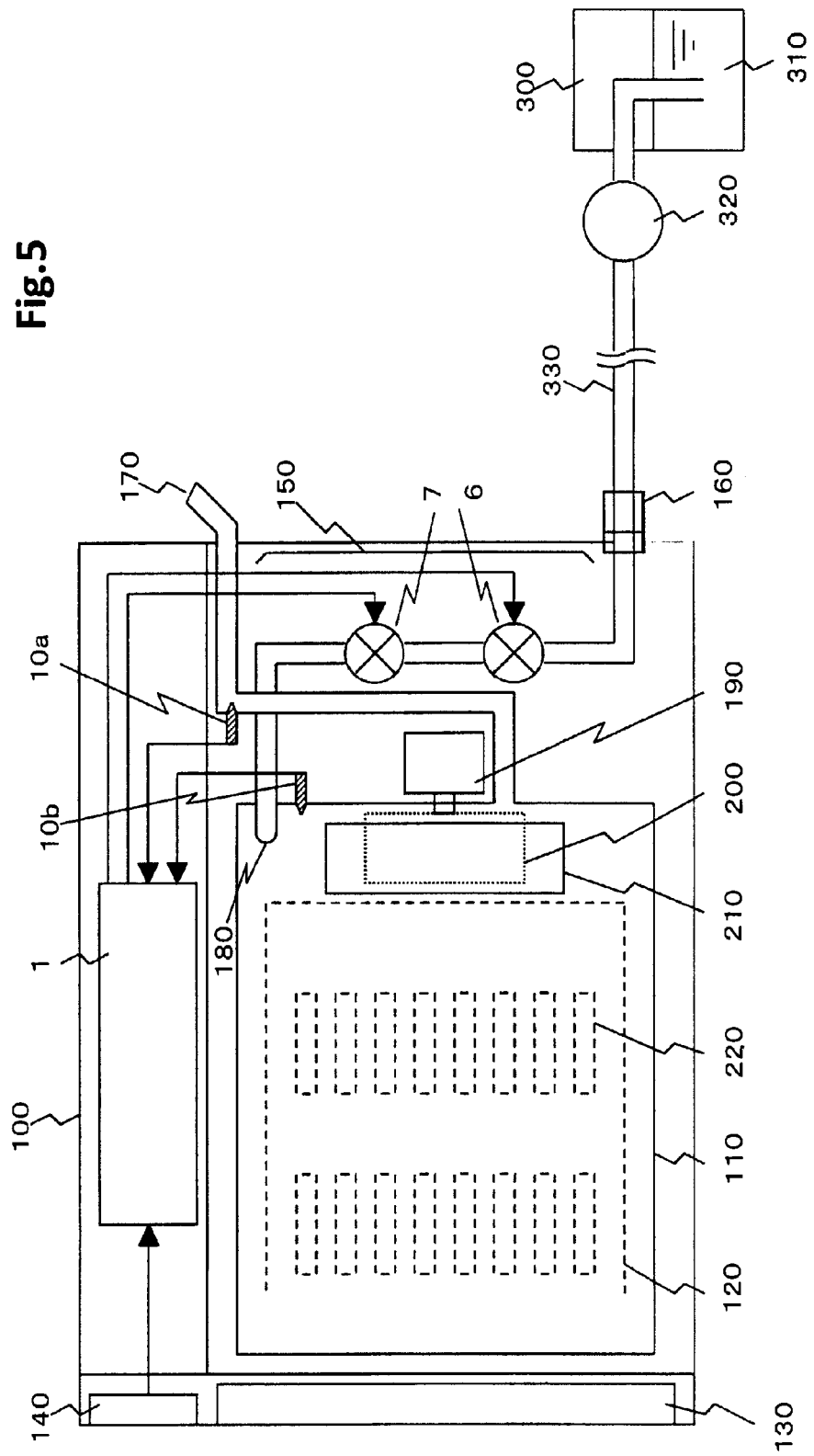

STEAM OVEN FOR AIRCRAFT

The present application is based on and claims priority of Japanese patent application No. 2010-286963 filed on Dec. 24, 2010, the entire contents of which are hereby incorporated by reference.

BACKGROUND OF THE INVENTION

1. Field of the Invention

The present invention relates to a steam oven provided on an aircraft.

2. Description of the Related Art

Japanese Patent Application Laid-Open Nos. 2010-210118 and 2006-69457 disclose a state of providing the steam oven for an aircraft on a galley and a water leakage prevention device.

Conventionally, software used in a controller of the steam oven for an aircraft is monitored and protected by a watchdog timer as in a general electronic device. It is supposed that the watchdog timer cannot be cleared within a certain time when a CPU controlled by the software does not normally act for some reasons, and there is a method of forcibly resetting the CPU after a certain time to solve an abnormal state of the software when the watchdog timer is not cleared.

However, the method does not solve a fundamental problem of the software and this is merely temporal solution, so that the problem might occur again. Also, when design of the software is not appropriate, a phenomenon in which abnormality occurs in a part of the software even though the watchdog timer functions occur. Therefore, it is said that mounting of the watchdog timer does not completely solve the abnormality of the software.

When the software is used to control a solenoid valve (hereinafter, referred to as a valve) for steam of the steam oven (hereinafter, referred to as an oven) used in the galley of an aircraft, it is predicted that the valve is abnormally released and an inside of the oven is filled with water for the steam, and further the water overflows under floor by defect of the software itself and runaway of the CPU occurred by failure of hardware. Since an electronic device is stored under floor of the aircraft, water leakage in large quantity is dangerous and measures against this are required.

SUMMARY OF THE INVENTION

In order to achieve the above-described object, the oven for an aircraft of the present invention is provided with a clock generator for measuring a time of a valve release period and a frequency counter for integrating the time as means of measuring a release time of the valve. Also, an amount of water used by the oven may be estimated by a product of the release time of the valve and a flow amount of the water, which passes through the valve, so that means is provided such that freeze and runaway of the CPU are monitored by integrating the release time of the valve, and when this becomes significantly longer than a supposed release time of the valve, a power supply of the valve is disconnected or a main power supply of the oven is disconnected considering that there is abnormality of the CPU.

By providing the above-described means, the amount of water used by the oven may be estimated. Therefore, an independent water leakage prevention circuit, which is not at all related to the software of the controller, may be built by setting a maximum amount of water above which it is considered to be dangerous based on the amount of water used by the oven when this normally acts and directly disconnecting the power supply of the valve or disconnecting the main power supply of the oven by judging that it is in a water leakage dangerous state when it is estimated that the amount of water becomes larger than the maximum amount of water.

BRIEF DESCRIPTION OF THE DRAWINGS

FIG. 5 is an illustrative diagram illustrating a cross section of the oven for an aircraft and supply of water.

DETAILED DESCRIPTION OF THE EMBODIMENT

Figure 4:
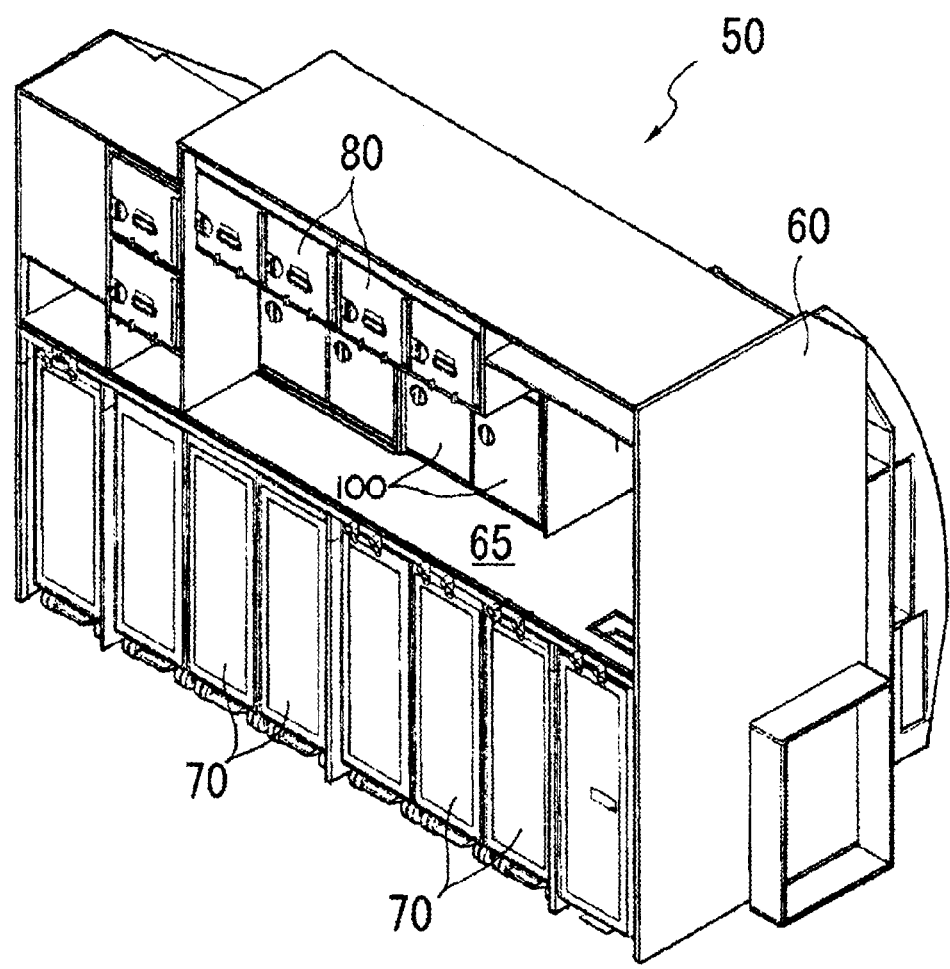
FIG. 4 is a perspective view of a galley unit of an aircraft to which the present invention is applied.

FIG. 4 is a perspective view of a galley unit for an aircraft to which the present invention is applied. Hereinafter, it is described with reference to FIG. 4.

The galley unit indicated by a reference numeral 50 as a whole has a casing 60 formed of a honeycomb panel material. The casing 60 is formed into a shape corresponding to an inner shape of an aircraft body of a portion on which the galley unit 50 is provided.

A compartment for storing a service cart is provided on a lower part of the casing 60 in which a large number of service carts 70 are stored. A large number of meal trays prepared in advance are stored in each of the service carts 70, and when not in use, the service cart 70 is fixed in the compartment by a stopper.

A counter 65 is provided on the casing 60 of the galley unit 50 and an oven 100 for cooking warm dishes is provided above the counter 65 in the casing in addition to a variety of storages and cooking devices 80.

FIG. 5 is an illustrative diagram illustrating a cross section of the oven for an aircraft and supply of water. Hereinafter, it is described with reference to FIG. 5.

The oven 100 has a unit for generating high-temperature steam for cooking ingredients, an inside 110 for accommodating cooked food, a door 130 for accessing the inside 110, and a control panel 140. Since the oven uses the steam for cooking, the oven requires the water. As the water, drinking water 310 from a water storage tank 300 provided in an aircraft is sent to the oven 100 through a pipeline 330 by means of a pump 320. The oven 100 receives the drinking water 310 at a joint 160 and thereafter supplies the water to a nozzle 180 of the inside 110 of the oven through a pipeline 150. Two valves 6 and 7 are inserted in series in the middle of the pipeline 150 for controlling an amount of water to be supplied to the nozzle 180.

The water, which passes through the valves 6 and 7, is sprinkled on a heater 210 from the nozzle 180 to be vaporized by hot air from a fan 200 directly connected to a motor 190 for blast, and is emitted to ingredients 220 inside through a blast guide 120. The steam emitted to the ingredients 220 is discharged from the inside 110 out of the oven through a steam discharge pathway 170. A steam temperature sensor 10a is provided in the middle of the steam discharge pathway for detecting a temperature of discharged steam to send to an oven controller 1.

A cooking temperature sensor 10b is provided above the heater 210 for detecting a cooking temperature to send to the oven controller 1. The oven controller 1 transmits a valve controlling command to the valves 6 and 7 to open and close the valves 6 and 7 based on information from the cooking temperature sensor 10a and the steam temperature sensor 10b. The oven controller 1 is also connected to the control panel 140, which performs operation of the oven and setting of cooking and displays operation information from the oven controller 1.

Figure 2:
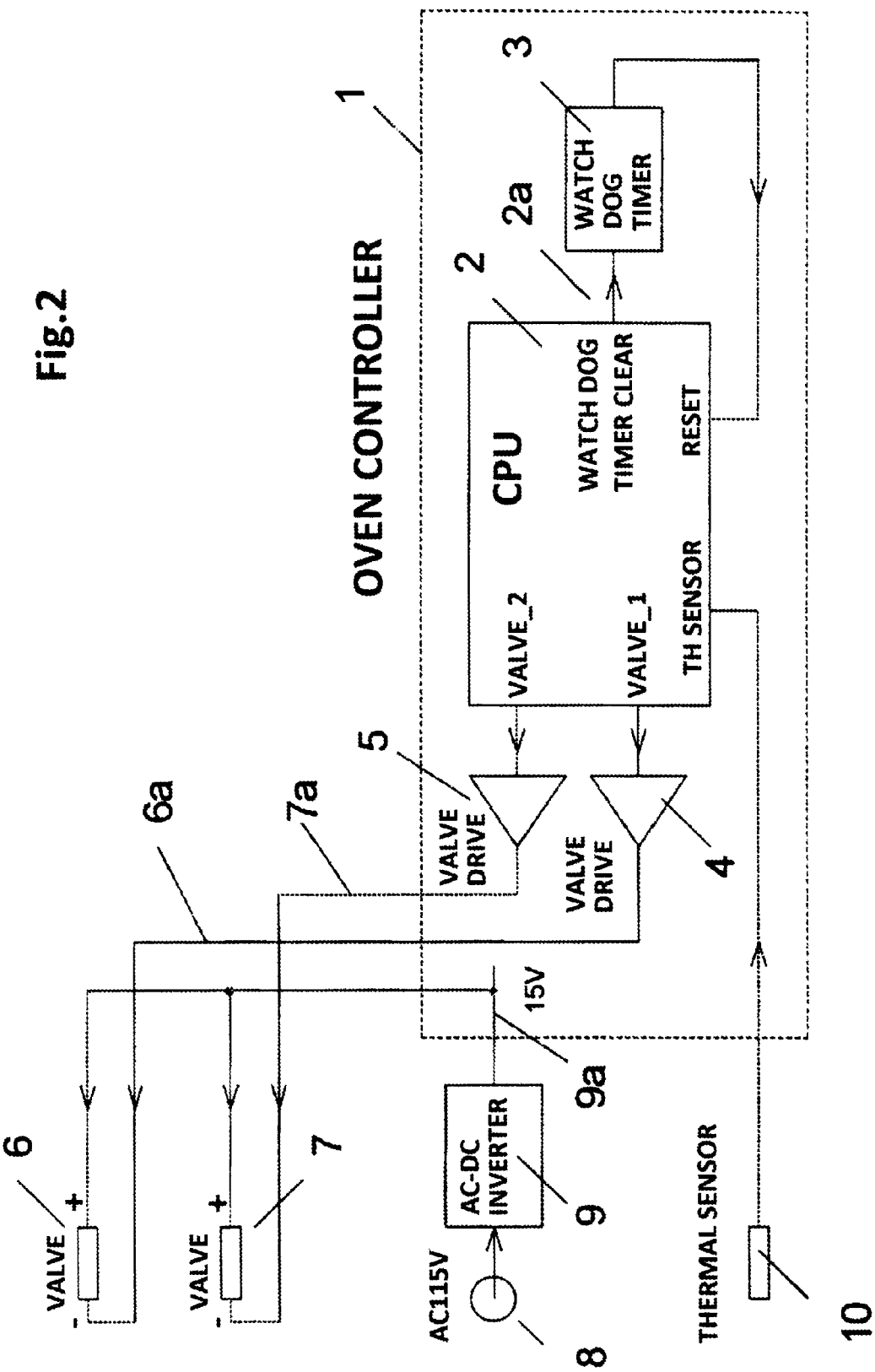
FIG. 2 is a system diagram illustrating valve control of a conventional oven for an aircraft.

FIG. 2 is a system diagram illustrating valve control of a conventional oven for an aircraft. Hereinafter, it is described with reference to FIG. 2.

Although the oven controller 1 performs operation of an entire oven device, a part, which is not related to the present invention, is omitted.

A CPU 2 in the oven controller 1 is a microprocessor for controlling the oven and is equipped with dedicated software for the oven and performs a great deal of processing of the oven controller, and a part, which is not related to the present invention, is omitted.

Also, a watchdog timer 3 is used for protecting the CPU 2 from freeze and runaway. The watchdog timer 3 outputs a reset pulse to the CPU 2 to forcibly reset the CPU 2 when an unexpected situation occurs in the CPU 2 for some reasons and a watchdog timer clear signal 2a cannot be output within a predetermined time. As a result, the CPU 2 stops operating and restarts from a first step just like when a power supply is turned on. By the restart of the CPU 2, it is possible to temporarily avoid a system abnormal situation. Therefore, such watchdog timer is widely adopted to a device equipped with the software.

The CPU 2 generates two types of valve controlling pulses to turn on/off switching elements of valve drives 4 and 5. Outputs of the valve drives 4 and 5 are supplied to minus terminals of the valves 6 and 7. Valve drive signals 6a and 7a are signals of the minus terminals of the valves 6 and 7, respectively. Also, plus terminals of the valves 6 and 7 are connected to a 15V DC power supply 9a, which is a part of the power supply obtained by AC/DC converting an AC input 8 by an AC-DC inverter 9.

When the 15 V DC power supply 9a is turned on and the switching elements of the valve drives 4 and 5 are turned on, a current flows through coils of the valves 6 and 7 and the valves are released. When the switching elements of the valve drives 4 and 5 are turned off or when the 15 V DC power supply 9a is turned off, the current does not flow through the coils of the valves 6 and 7, so that the valves are closed by force of springs in the valves. A temperature sensor 10 for measuring the steam temperature and the cooking temperature (the steam temperature sensor 10a and the cooking temperature sensor 10b in FIG. 5) is connected to the oven controller 1. The CPU 2 controls the valves according to the steam temperature and the cooking temperature. Another input/output port of the CPU 2 is not directly related to the present invention, so that description thereof is omitted. Although the AC-DC inverter 9 supplies an entire power supply used by the oven, this is not directly related to the present invention, so that description thereof is omitted.

Figure 1:
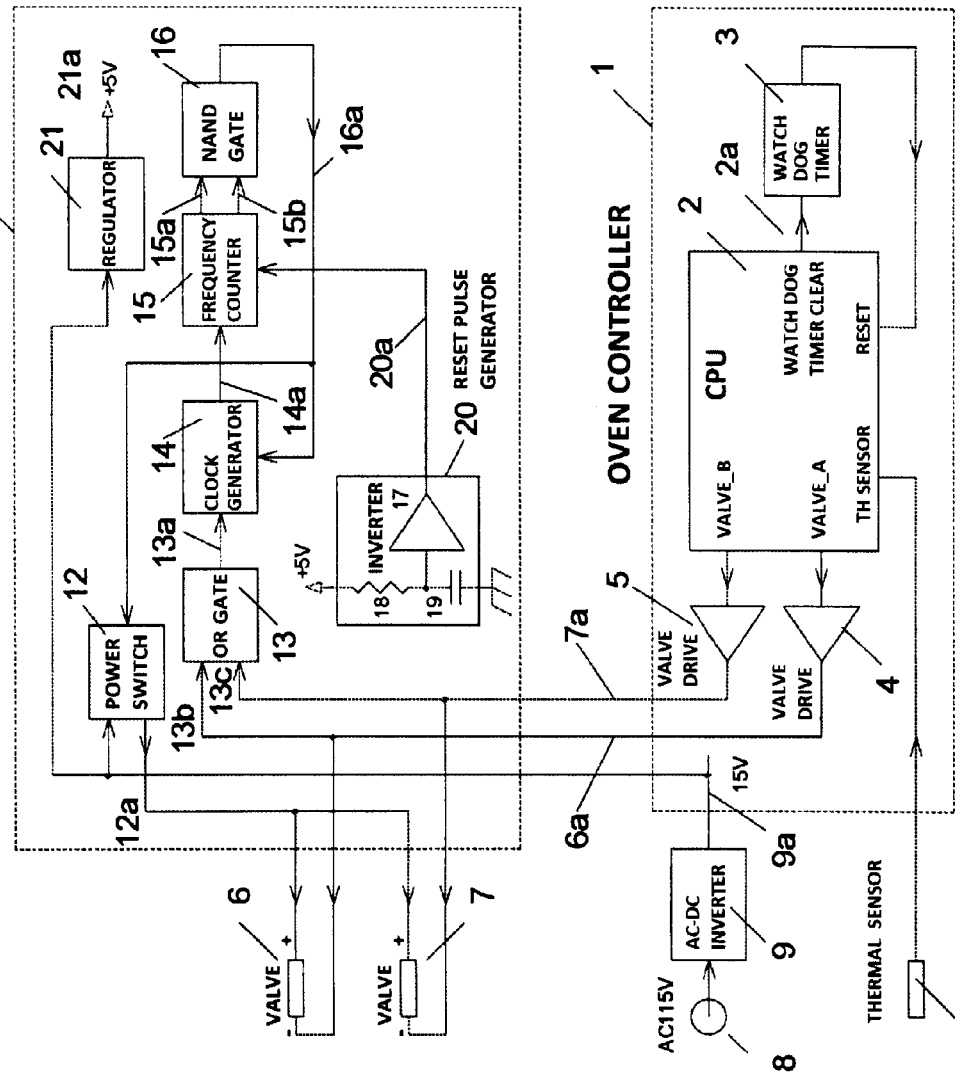
FIG. 1 is a system diagram illustrating a water leakage prevention circuit and valve control of an oven for an aircraft of the present invention.

FIG. 1 is a system diagram illustrating a water leakage prevention circuit and valve control of the oven for an aircraft of the present invention, in which a water leakage prevention circuit 11 of the present invention is connected to the conventional oven controller 1 in FIG. 2. Hereinafter, it is described with reference to FIG. 1. The valve drive signal 6a output from the valve drive 4 is supplied to the minus terminal of the valve 6 and is supplied to an OR gate input 13b. Similarly, the valve drive signal 7a output from the valve drive 5 is supplied to the minus terminal of the valve 7 and is supplied to an OR gate input 13c. The plus terminals of the valves 6 and 7 are connected to the 15 V DC power supply 9a through a power switch 12. An OR gate output 13a, which passes through an OR gate 13, is supplied to a clock generator 14 and is shifted from a High level to a Low level in a period in which both of the OR gate inputs 13b and 13c are at the Low level to generate a clock pulse output 14a. The clock pulse output 14a output from the clock generator 14 is supplied to a clock terminal of a frequency counter 15.

The frequency counter 15 counts the clock pulse output 14a and outputs 15a and 15b thereof are transmitted to a NAND gate 16. An output 16a of the NAND gate 16 is shifted from the High level to the Low level when input signals of the counter outputs 15a and 15b are at the High level, and is supplied to the power switch 12 to open the power switch 12. Also, the NAND gate output 16a is transmitted to the clock generator 14 to stop clock generation. The 15 V DC power supply 9a is supplied to an input of a regulator 21, a voltage thereof is decreased to 5 V, and an output 21a is supplied as a 5 V DC power supply in the oven water leakage prevention circuit 11.

A reset pulse generator 20 includes a level inverter 17, a resistance 18, and a capacitor 19, one ends of the resistance 18 and the capacitor 19 are connected to an input of the level inverter 17, the other end of the resistance 18 is connected to the 5 V DC power supply 21a, and the other end of the capacitor 19 is connected to ground.

The voltage 9a is supplied from the AC-DC inverter to the input of the regulator 21, and when the voltage of the output 21a rises to 5V, an output of the level inverter 17 is at the High level during a period until the capacitor 19 is charged up to about 2.5 V. Thereafter, when the capacitor 19 is charged more than about 2.5 V with the voltage, the level inverter 17 is shifted to the Low level. Therefore, by supplying the output of the level inverter 17 to the frequency counter 15 as a power supply reset signal 20a, the frequency counter 15 is reset when the power supply is turned on.

When both of the valves 6a and 7a are at the Low level, the valves 6 and 7 are released together and the water for the steam is emitted inside the oven. It can be said that the output of the OR gate 13 exactly represents inflow of the water. Therefore, by reading a time when the output of the OR gate 13 is at the Low level, an amount of the water emitted inside the oven may be found.

Reading of such a valve release time may be realized by counting the number of clocks in a valve release period in which the water inflows using the clock pulse output 14a of which cycle is sufficiently shorter than the valve release period. The shorter the clock cycle, the more correct the reading of the valve release time, but the magnitude of the frequency counter 15, which counts, becomes enormous. As the clock generator 14, which generates continuous pulses at a constant frequency in general, a start-stop oscillator is adopted in this application. This is because the start-stop type may minimize a time period in which the oscillator operates, and an effect thereof is large when electromagnetic emission limit is strict as in the aircraft. Also, when the valve release period is correctly defined by the CPU 2, counting error generated by an asynchronous clock may be eliminated by generating the clock pulse output 14a at the frequency synchronous with the valve release period by the clock generator 14.

Figure 3:
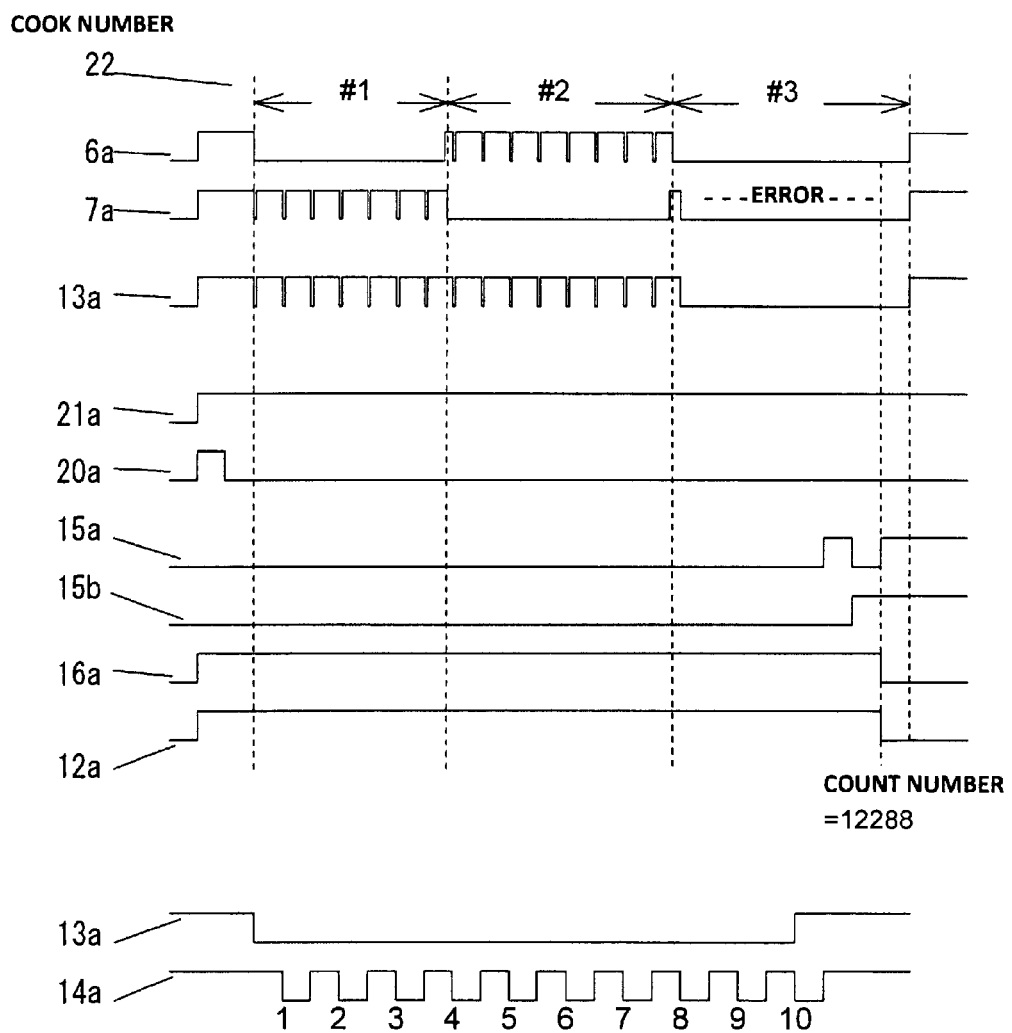
FIG. 3 illustrates each waveform in cooking by the oven corresponding to FIG. 1.

FIG. 3 illustrates each waveform in the cooking of the oven corresponding to FIG. 1. Hereinafter, it is described with reference to FIG. 3.

A reference numeral 22 indicates a cook number, which is the number of cooking performed after the power supply of the oven is turned on. A reference numeral 6a indicates a waveform of the drive signal of the valve 6. A state in which the waveform is at the Low level and the valve 6 is always in a released state is illustrated in cooking #1 and cooking #3. A state in which release and close are repeated at periodic intervals is illustrated in cooking #2. A reference numeral 7a indicates a waveform of the drive signal of the valve 7. A state in which the release and the close are repeated at periodic intervals is illustrated in the cooking #1. A state in which the waveform is at the Low level and the valve 7 is in the released state is illustrated in the cooking #2. A state in which the waveform is at the Low level by error is illustrated in the cooking #3 in which, originally, the release and the close should be repeated at periodic intervals as in the cooking #1. A reference numeral 13a indicates a waveform of the OR gate output, and a state in which the Low level is output when both of the above-described OR gate inputs 6a and 7a are at the Low level is illustrated. A reference numeral 21a indicates a waveform of the 5 V DC power supply, and a rising waveform of the power supply is illustrated.

A reference numeral 20a indicates a waveform of the reset pulse of the frequency counter, and a state when the power supply is turned on is illustrated. A reference numeral 15a indicates a waveform of a $2^{12}$-digit binary counter output of the frequency counter 15, and a state in which it is shifted from Low to High when $2^{12}$ counting the clock pulse output 14a is illustrated. Similarly, a reference numeral 15b indicates a waveform of a $2^{13}$-digit binary counter output of the frequency counter 15, and a state in which it is shifted from Low to High when $2^{13}$ counting the clock pulse output 14a is illustrated. A reference numeral 16a indicates a waveform of a NAND output, and a state in which it is shifted from the High level to the Low level when an integrated value obtained by counting the clock pulse output 14a reaches 12288 and when both of the above-described 15a and 15b are at the High level is illustrated. A reference numeral 12a indicates a waveform of a power switch output, and a state in which the output is turned off when the above-described 16a is shifted from High to Low is illustrated.

The reference numeral 13a on a lower side of FIG. 3 indicates the waveform in which a time axis of the OR gate output waveform 13a on an upper side is enlarged, and a state in which a period of the Low level is 0.1 second is illustrated. A reference numeral 14a indicates a waveform of the clock pulse output corresponding to the above-described 13a, and a state in which 10 pulses are generated is illustrated. A condition of an oscillation frequency at that time is 90 to 100 Hz. Therefore, herein, the oscillation frequency of the clock pulse output 14a is adjusted to be approximately 95 Hz. Although a counter number, which can be counted by one package, is used by 15a and 15b, when this is not sufficient, it is required to cascade another stage of frequency counter.

In a case of FIG. 3, a maximum count value is set to 12288 ($=2^{13}+2^{12}$) by a maximum digit and an output next to this digit of one counter using the NAND gate 16. In such a case, for example, when generating 10 clock pulses during a 0.1-second valve release period at 1.5-second valve intervals and counting the same by the frequency counter while setting the maximum count value to 12288, a sum total of the valve intervals is 12288/10=1228.8, and integration of the valve release time is 1228.8×0.1=122.88 seconds. Also, when this is converted to the amount of water and a flow amount of the water, which passes through the valve, is 3.25 cc/sec, 3.25× 122.88=399.36 cc is obtained.

By utilizing the above-described function, the present invention can first set a maximum-limit water leakage amount, calculate a maximum limit of a total of release time of the valve by dividing the water leakage amount by a value of the flow amount of the valve, set a clock pulse frequency and the maximum count value of the frequency counter corresponding to the same, and stop supplying the water by turning off a driving power supply of the valve by judging that there is an abnormal situation when the number of clock pulses becomes larger than the maximum count value of the frequency counter, thereby preventing the water leakage.

It is also possible to turn off a main power supply of the oven instead of turning off the driving power supply of the valve.

Although the two valves 6 and 7 are inserted in series in the middle of the pipeline 150 in the oven of the present invention, this is a method of improving reliability of the valve control, and it is evident that a similar function may also be obtained by a single valve.

Although the water leakage prevention circuit 11 is provided with a circuit for resetting the frequency counter when turning on the main power supply of the oven to monitor the water leakage by returning the frequency counter 15 to an initial value for each time the power supply is turned on, it is possible to build a smaller size of water leakage prevention circuits by resetting the frequency counter 15 for each cooking of the oven, for example, and there is a problem of how to detect end of the cooking.

What is claimed is:
1. A steam oven for an aircraft with a water leakage prevention function which heats and cooks ingredients provided on an aircraft with high-temperature steam, comprising:
    solenoid valves for controlling an amount of water to a nozzle which generates steam in the oven;
    a controller for controlling a device of the oven including a control signal of the solenoid valves for controlling the amount of water to the nozzle by periodically repeating releasing and closing of the solenoid valves; and
    a solenoid valve power supply for supplying current to each of the solenoid valves,
    wherein a water leakage prevention circuit is configured to include a clock pulse generator of a continuous constant frequency with a cycle being sufficiently shorter than a valve release period, which is configured to measure a time of the release period of the solenoid valve, and a frequency counter for integrating and counting the number of pulses of the clock pulse generator only during the release period of the solenoid valve,
    count the number of pulses of the clock pulse generator corresponding to the release period of the solenoid valve,
    estimate the amount of water used by the steam oven from the counted number of pulses,
    estimate a maximum valve release period during water supply of an abnormal and dangerous level, in order to prevent water supply beyond the abnormal and dangerous level which occurs due to failure of the controller in control of the solenoid valve,
    calculate a maximum clock pulse count value corresponding to the maximum valve release period,
    disconnect the solenoid valve power supply or a main power supply of the steam oven, when the counted value by the frequency counter of the water leakage prevention circuit becomes larger than the maxim clock pulse count value, and forcibly put the solenoid valve into a closed state and interrupt the supply of water, so as to prevent water leakage, wherein the frequency counter of the water leakage prevention circuit further includes a circuit which resets the frequency counter to an initial value each time the power supply is turned on, and wherein the water leakage prevention circuit is configured from discrete components without any involvement of a software.

2. The steam oven for an aircraft with the water leakage prevention function according to claim 1, wherein the clock pulse generator is the clock pulse generator for starting generating operation of a clock pulse of a continuous constant frequency with a cycle being sufficiently shorter than a valve release period in synchronization with starting timing of the release period of the solenoid valve and stopping the generating operation of the clock at end timing of the release period.

* * * * *